US012061267B2

(12) United States Patent
Sakata et al.

(10) Patent No.: US 12,061,267 B2
(45) Date of Patent: Aug. 13, 2024

(54) EXTERNAL ENVIRONMENT RECOGNITION DEVICE

(71) Applicant: Hitachi Astemo, Ltd., Hitachinaka (JP)

(72) Inventors: Kosuke Sakata, Hitachinaka (JP); Masayoshi Kuroda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 547 days.

(21) Appl. No.: 17/295,706

(22) PCT Filed: Nov. 29, 2019

(86) PCT No.: PCT/JP2019/046722
§ 371 (c)(1),
(2) Date: May 20, 2021

(87) PCT Pub. No.: WO2020/121838
PCT Pub. Date: Jun. 18, 2020

(65) Prior Publication Data
US 2021/0389469 A1 Dec. 16, 2021

(30) Foreign Application Priority Data

Dec. 12, 2018 (JP) .................................. 2018-232731

(51) Int. Cl.
*G01S 17/931* (2020.01)
*B60W 40/06* (2012.01)
(Continued)

(52) U.S. Cl.
CPC ........... *G01S 17/931* (2020.01); *B60W 40/06* (2013.01); *B60W 40/08* (2013.01); *B60W 50/06* (2013.01);
(Continued)

(58) Field of Classification Search
CPC ...... G01S 17/931; G01S 7/4814; G01S 7/497; G01S 17/42; B60W 40/06; B60W 40/08; B60W 50/06; B60W 50/14
(Continued)

(56) References Cited

U.S. PATENT DOCUMENTS

2011/0255918 A1* 10/2011 Worsley .................. E01C 19/48
404/84.1
2013/0120575 A1* 5/2013 Byun .................... G06F 18/251
348/148
(Continued)

FOREIGN PATENT DOCUMENTS

JP  2003-006796 A  1/2003
JP  2009-053059 A  3/2009
(Continued)

OTHER PUBLICATIONS

International Search Report with English translation and Written Opinion issued in corresponding application No. PCT/JP2019/046722 dated Mar. 24, 2020.
(Continued)

*Primary Examiner* — Yazan A Soofi
(74) *Attorney, Agent, or Firm* — Foley & Lardner LLP (57) ABSTRACT

Regardless of the irradiation method of the distance measuring sensor, degradation of recognition performance due to a change in the installation position of the distance measuring sensor is suppressed. An outside environment recognition device (12) that recognizes an outside environment around a vehicle according to an observation result of a LiDAR sensor (11) installed in the vehicle is configured to include a storage unit (21) that stores posture information of an installation posture of the LiDAR sensor in a three-dimensional predetermined coordinate system, a coordinate signal conversion unit (23) that converts a plurality of observation points obtained from the LiDAR sensor into a
(Continued)

plurality of three-dimensional coordinate signals on the basis of the posture information in the predetermined coordinate system, a road surface candidate point extraction unit (24) that extracts a plurality of road surface candidate points indicating a road surface from the plurality of three-dimensional coordinate signals based on a height component of each of the three-dimensional coordinate signals, a road surface plane estimation unit (25) that estimates a road surface plane based on the plurality of road surface candidate points, and a calibration amount calculation unit (26) that calculates a calibration amount of the posture information based on a reference plane set based on the predetermined coordinate system and the road surface plane.

8 Claims, 9 Drawing Sheets

(51) Int. Cl.
| | | |
|---|---|---|
| *B60W 40/08* | (2012.01) | |
| *B60W 50/06* | (2006.01) | |
| *B60W 50/14* | (2020.01) | |
| *G01S 7/481* | (2006.01) | |
| *G01S 7/497* | (2006.01) | |
| *G01S 17/42* | (2006.01) | |

(52) U.S. Cl.
CPC ........... *B60W 50/14* (2013.01); *G01S 7/4814* (2013.01); *G01S 7/497* (2013.01); *G01S 17/42* (2013.01); *B60W 2040/0881* (2013.01); *B60W 2420/408* (2024.01)

(58) Field of Classification Search
USPC .......................................................... 701/117
See application file for complete search history.

(56) References Cited

U.S. PATENT DOCUMENTS

| | | | |
|---|---|---|---|
| 2018/0267558 A1* | 9/2018 | Tiwari | H04N 23/90 |
| 2019/0293772 A1* | 9/2019 | Pfeiffer | G05D 1/024 |
| 2020/0317228 A1* | 10/2020 | Otake | B60W 50/14 |
| 2021/0181354 A1* | 6/2021 | Becher | G01S 19/01 |
| 2022/0075074 A1* | 3/2022 | Kang | G01S 17/931 |
| 2022/0180643 A1* | 6/2022 | Retterath | G06T 7/20 |
| 2023/0166728 A1* | 6/2023 | Hosaka | G05D 1/0272 |
| | | | 701/28 |
| 2023/0332915 A1* | 10/2023 | Lee | G01C 21/3638 |
| | | | 701/438 |

FOREIGN PATENT DOCUMENTS

| | | |
|---|---|---|
| JP | 4232167 B1 | 3/2009 |
| JP | 2013-019799 A | 1/2013 |
| JP | 2015-075382 A | 4/2015 |
| JP | 2015-078925 A | 4/2015 |
| JP | 2018-173749 A | 11/2018 |

OTHER PUBLICATIONS

Office Action issued in corresponding Chinese Patent Application No. 201980077555.7, dated Nov. 28, 2023, with Machine translation (13 pages).

* cited by examiner

EXTERNAL ENVIRONMENT RECOGNITION DEVICE

TECHNICAL FIELD

The present invention relates to an outside environment recognition device.

BACKGROUND ART

Conventionally, there has been known an outside environment recognition device that detects a position of an object existing in the periphery, a white line on a road, or the like using a distance measuring sensor such as a laser imaging detection and ranging (LiDAR) sensor. The distance measuring sensor measures a distance to an object by emitting laser light in a pulse shape and measuring a time interval until reflected light from the object is received. In this case, the distance measuring sensor can detect the position of the object in the three-dimensional space from the reflected light of the laser light by sequentially changing the irradiation angle of the laser element in addition to providing the plurality of laser elements for each irradiation angle.

In order to convert the distance information obtained from the distance measuring sensor into a coordinate signal in the three-dimensional space, it is general to obtain the distance information from the irradiation angle of the laser light and the information of the known installation posture of the distance measuring sensor itself by calculation using a trigonometric function or the like. Therefore, when the installation posture of the distance measuring sensor does not coincide with the installation posture at the time of design (at the time of factory shipment), the coordinate signal of the three-dimensional coordinates converted from the distance information does not coincide with the position of the actual object and has an error. It is conceivable that the installation posture of the distance measuring sensor deviates from the design value due to an external factor such as a change over time or the like or an impact, and it is assumed that the deviation increases and adversely affects the recognition performance of the outside environment recognition device.

As an outside environment recognition device to solve this problem, for example, there has been proposed an outside environment recognition device that estimates a road surface by sweeping and irradiating laser light from a distance measuring sensor, and calculates a calibration amount of an observation point from a difference between a road surface plane and a predetermined reference plane (see, for example, PTL 1). The outside environment recognition device described in PTL 1 detects the road surface by using the fact that the distance from the light emitting element of the distance measuring sensor to the flat structure with less undulations does not change abruptly. An observation point with a gentle change in distance is adopted as a road surface candidate point, and a calibration amount is calculated from a deviation between a road surface plane estimated from the road surface candidate point and a predetermined reference plane. Then, the relative position information of the observation point is corrected by the calibration amount, so that the degradation of the recognition performance of the outside environment recognition device is suppressed.

CITATION LIST

Patent Literature

PTL 1: JP 2015-75382 A

SUMMARY OF INVENTION

Technical Problem

However, since the outside environment recognition device described in PTL 1 uses the fact that the change in the distance of the observation point of the planar structure is small, not only the road surface but also the observation point of the object having the planar structure such as the wall of a building or the side panel of the platform of a truck is adopted as the road surface candidate point. For this reason, the road surface plane estimated from the road surface candidate points includes many errors, and it is not possible to sufficiently suppress the degradation of the recognition performance of the outside environment recognition device due to the change in the installation posture of the distance measuring sensor. In addition, the outside environment recognition device described in PTL 1 is based on a sweep irradiation type distance measuring sensor having a mechanical rotation mechanism, and cannot be applied to other flash type distance measuring sensors.

The invention solves the above problems, and an object of the invention is to provide an outside environment recognition device capable of suppressing deterioration in recognition performance due to a change in an installation position of a distance measuring sensor regardless of an irradiation type of the distance measuring sensor.

Solution to Problem

An outside environment recognition device according to an aspect of the invention recognizes an outside environment around a vehicle by laser light emitted from a distance measuring sensor installed in the vehicle. The outside environment recognition device includes a storage unit that stores posture information of an installation posture of the distance measuring sensor in a three-dimensional predetermined coordinate system, a coordinate signal conversion unit that converts a plurality of observation points obtained from the distance measuring sensor into a plurality of three-dimensional coordinate signals on the basis of the posture information in the predetermined coordinate system, a road surface candidate point extraction unit that extracts a plurality of road surface candidate points indicating a road surface from the plurality of three-dimensional coordinate signals based on a height component of each of the three-dimensional coordinate signals, a road surface plane estimation unit that estimates a road surface plane based on the plurality of road surface candidate points, and a calibration amount calculation unit that calculates a calibration amount of the posture information based on a reference plane set based on the predetermined coordinate system and the road surface plane.

Advantageous Effects of Invention

According to the invention, it is possible to calculate the calibration amount of an installation posture of a distance measuring sensor under an actual environment and sufficiently suppress the degradation of the recognition performance of an outside environment recognition device due to the change in the installation posture of the distance measuring sensor regardless of the irradiation method of the distance measuring sensor. In addition, the method of the distance measuring sensor is not limited. Other features of the invention will be clear from the description and the accompanying drawings. In addition, objects, configurations, and effects besides the above description will be apparent through the explanation on the following embodiments.

DESCRIPTION OF EMBODIMENTS

Figure 1:
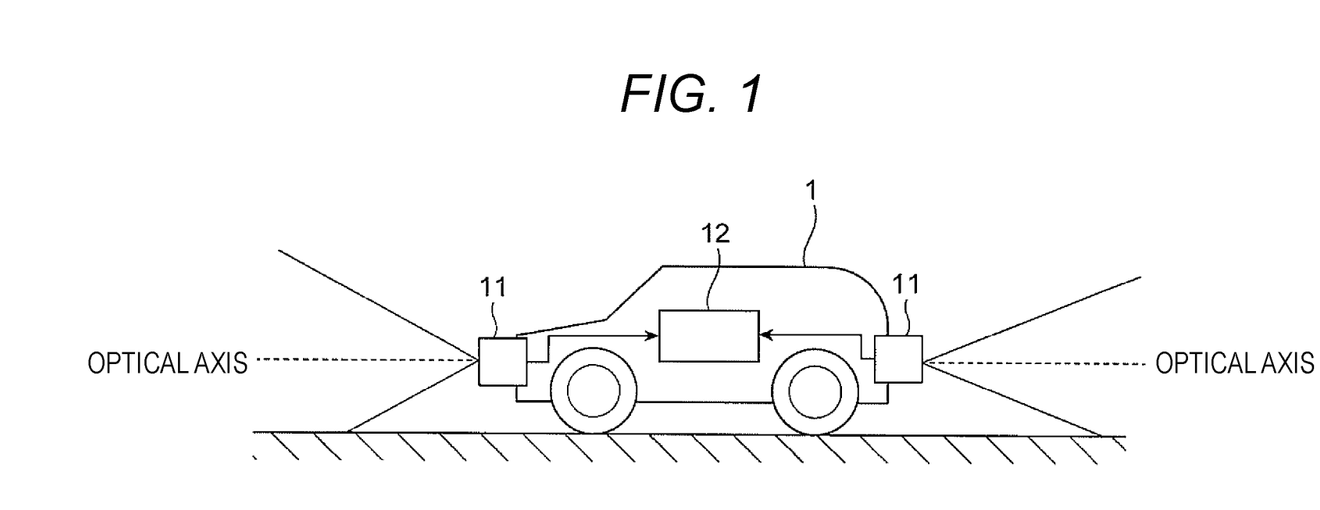
FIG. 1 is a schematic diagram of an outside environment recognition system mounted on a vehicle according to the present embodiment.

Hereinafter, an outside environment recognition system according to the present embodiment will be described with reference to the accompanying drawings. FIG. 1 is a schematic diagram of an outside environment recognition system mounted on a vehicle according to the present embodiment. The outside environment recognition system illustrated in FIG. 1 includes a pair of front and rear LiDAR sensors (distance measuring sensors) 11 installed on a bumper of a vehicle 1, and an outside environment recognition device 12 installed inside the vehicle 1. In a state at the time of factory shipment, the optical axes of the pair of LiDAR sensors 11 are installed in the vehicle 1 so as to be perpendicular to the vertical direction of the vehicle and parallel to the front-rear direction of the vehicle. The angle and height information of the installation posture of the LiDAR sensor 11 at the time of factory shipment are stored in the outside environment recognition device 12 as initial design values. Note that, in the present embodiment, the LiDAR sensor 11 is installed one before and one after at the height of the bumper of the vehicle 1, but the installation location and the number of the LiDAR sensors 11 may be arbitrarily designed. In addition, as the initial design value of the installation posture, an arbitrary angle and height can be installed.

In this outside environment recognition system, laser light is emitted from the LiDAR sensor 11, and an observation point that is a reflection point of the laser light is calibrated on the basis of a known installation posture of the LiDAR sensor 11, and the outside environment around the vehicle is recognized. At this time, the outside environment recognition device 12 stores posture information of the installation posture at the time of factory shipment as a known installation posture, but in a case where the LiDAR sensor 11 changes from the installation posture at the time of factory shipment, an error occurs between the environment recognized by the outside environment recognition device 12 and the actual environment. That is, the outside environment recognition device 12 can recognize the surrounding environment of the vehicle 1 from the observation result of the LiDAR sensor 11, but cannot recognize the actual installation posture of the LiDAR sensor 11. Therefore, there is a possibility that the outside environment recognition device 12 erroneously recognizes that the observation result of the LiDAR sensor 11 is correct even though the deviation occurs in the installation posture of the LiDAR sensor 11.

Normally, a dealer's test environment is required to correct the installation posture of the LiDAR sensor 11. However, it is not realistic to deposit the vehicle 1 to the dealer only to change the installation posture of the LiDAR sensor 11. Therefore, the outside environment recognition device 12 according to the present embodiment estimates the road surface on the basis of the assumption that the observation point of the road surface observed by the LiDAR sensor 11 exists in the vicinity of the height 0 [m] which is the ground contact surface of the vehicle 1. Then, on the assumption that the inclination of the road surface observed by the LiDAR sensor 11 having the correct installation posture is parallel to the optical axis of the LiDAR sensor 11, the calibration amount of the posture information of the LiDAR sensor 11 with respect to the road surface is calculated. As described above, even under the actual environment, the road surface is estimated while excluding the influence of observation points other than the road surface as much as possible, and the outside environment recognition device 12 is caused to recognize the actual installation posture of the LiDAR sensor 11 from the deviation between the estimated road surface and the real road surface.

Figure 2:
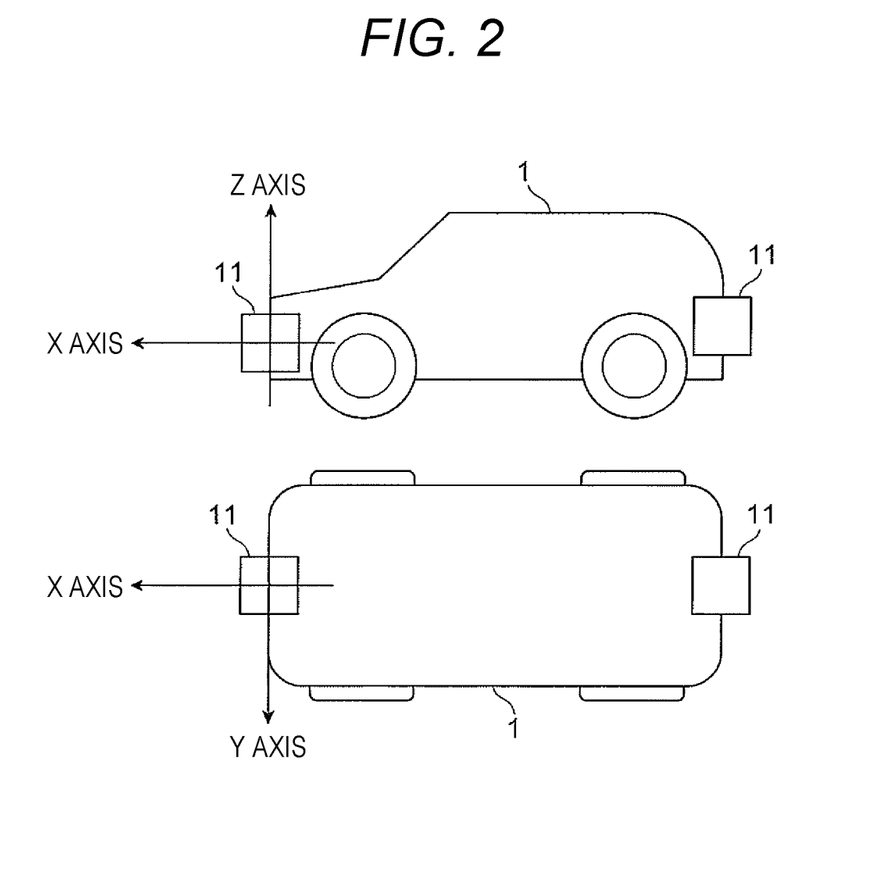
FIG. 2 is an explanatory diagram of a LiDAR coordinate system according to the present embodiment.

Hereinafter, a detailed configuration of the outside environment recognition system of the present embodiment will be described. Hereinafter, in order to describe the present embodiment, coordinate axes of the XYZ orthogonal coordinate system of the LiDAR sensor 11 installed in the vehicle are defined as follows as a LiDAR coordinate system (predetermined coordinate system) which is a predetermined three-dimensional coordinate system. The LiDAR coordinate system is a coordinate system defined in advance in a test environment or the like, and does not change even when the installation posture of the LiDAR sensor 11 changes. As illustrated in FIG. 2, the traveling direction of the vehicle 1, that is, the front-rear direction is defined as the X axis, the front is defined as the positive direction of the X axis, and the rear is defined as the negative direction of the X axis. The vehicle width direction of the vehicle 1, that is, the left-right direction is defined as the Y axis, the left side is defined as the positive direction of the Y axis, and the right side is defined as the negative direction of the Y axis. The vertical direction of the vehicle 1 is defined as a Z axis, the upper side is defined as the positive direction of the Z axis, and the lower side is defined as the negative direction of the Z axis. The origin of the coordinate axes is a point at which the light source of the LiDAR sensor 11 is located, and the plurality of LiDAR sensors 11 has coordinate axes for each LiDAR sensor 11.

As for the angle of the optical axis of the LiDAR sensor 11, an angle with the Y axis as the rotation axis is defined as a pitch angle, an angle with the X axis as the rotation axis is defined as a roll angle, and an angle with the Z axis as the rotation axis is defined as a yaw angle. For the pitch angle, the positive direction of the Z axis is defined as 0 degrees, and the positive direction of the X axis is defined as 90 degrees. For the roll angle, the positive direction of the Z axis is defined as 0 degrees, and the positive direction of the Y axis is defined as 90 degrees. For the yaw angle, the positive direction of the X axis is defined as 0 degrees, and the positive direction of the Y axis is defined as 90 degrees. Based on the above, when the installation posture of the LiDAR sensor 11 illustrated in FIG. 1 is taken as an example, the angles of the optical axis of the LiDAR sensor 11 on the front side are a pitch angle of 90 degrees, a roll angle of 0 degrees, and a yaw angle of 0 degrees, and the LiDAR sensor 11 on the rear side is a pitch angle of 270 degrees, a roll angle of degrees, and a yaw angle of 180 degrees. The LiDAR coordinate axes defined as described above are an example, and may be defined by different coordinate axes of course.

Figure 3:
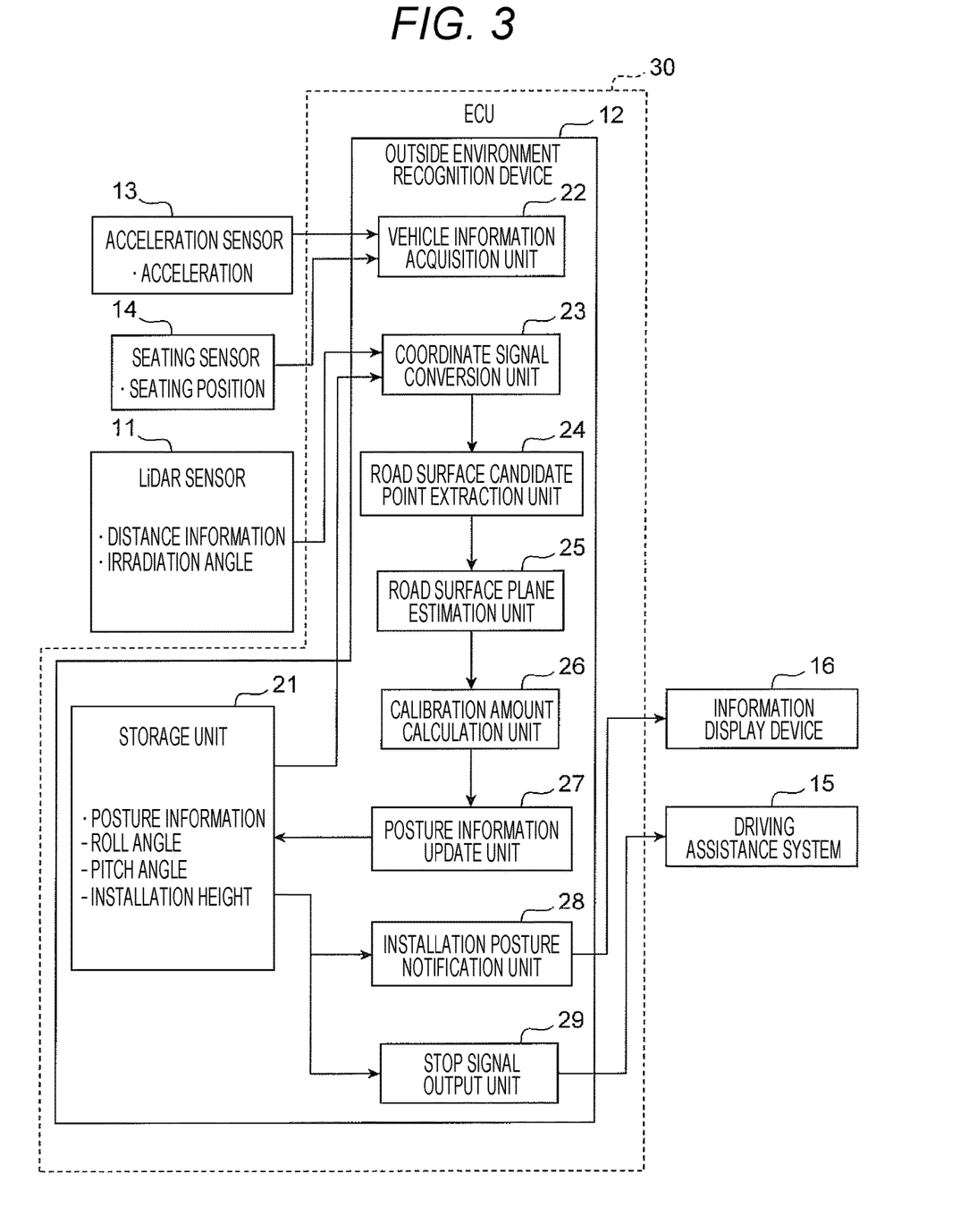
FIG. 3 is a block diagram illustrating a system configuration of an outside environment recognition system according to the present embodiment.

FIG. 3 is a block diagram illustrating a system configuration of the outside environment recognition system according to the present embodiment. The outside environment recognition system is provided with an outside environment recognition device 12 that recognizes the surrounding environment of the vehicle 1 according to the observation result of the LiDAR sensor 11. The LiDAR sensor 11, an acceleration sensor 13, and a seating sensor 14 are connected to the outside environment recognition device 12. The LiDAR sensor 11 detects distance information to the object for each irradiation angle on the basis of the time from when the light emitting element emits laser light to when the light receiving element receives reflected light from the object, and outputs the distance information to the outside environment recognition device 12. Note that the internal structure and sensing method of the LiDAR sensor 11 are not limited. The pair of LiDAR sensors 11 may be sweep irradiation LiDAR sensors in which the light emitting element and the light receiving element are rotated by a motor mechanism, or may be flash LiDAR sensors without a motor mechanism. In addition, the irradiation systems of the pair of LiDAR sensors 11 may be different.

The acceleration sensor 13 detects the acceleration of the vehicle 1 and outputs the acceleration to the outside environment recognition device 12. The acceleration sensor 13 is used to detect whether the vehicle 1 is traveling, stopping, or slowing down. The seating sensor 14 detects the presence or absence of seating of a passenger on the seating seat and outputs the detection result to the outside environment recognition device 12. The seating sensor 14 is provided for each seating position of the seating seat, and is used to detect the seating position of the passenger. Further, a driving assistance system 15 and an information display device 16 are connected to the outside environment recognition device 12. The driving assistance system 15 performs various driving assistance including an automatic driving function using the recognition result of the outside environment recognition device 12. The driving assistance system 15 may be a single driving assistance system or a plurality of driving assistance systems. The information display device 16 is a device having a liquid crystal screen or an LED lamp that presents various types of information to the driver. The information display device 16 is used to provide the driver with the actual installation posture of the LiDAR sensor 11.

The outside environment recognition device 12 includes a storage unit 21, a vehicle information acquisition unit 22, a coordinate signal conversion unit 23, a road surface candidate point extraction unit 24, a road surface plane estimation unit 25, a calibration amount calculation unit 26, a posture information update unit 27, an installation posture notification unit 28, and a stop signal output unit 29. The storage unit 21 stores posture information of the installation posture of the LiDAR sensor 11 in a predetermined LiDAR coordinate system. The storage unit 21 stores a pitch angle, a roll angle, an installation height, and the like as parameters of posture information of the LiDAR sensor 11. The vehicle information acquisition unit acquires the acceleration of the vehicle 1 from the acceleration sensor 13 and acquires the seating position of the passenger of the vehicle 1 from the seating sensor 14. Although details will be described later, the traveling state of the vehicle 1 and the seating position of the passenger are stored in the storage unit 21 in association with the posture information of the LiDAR sensor 11.

Figure 5:
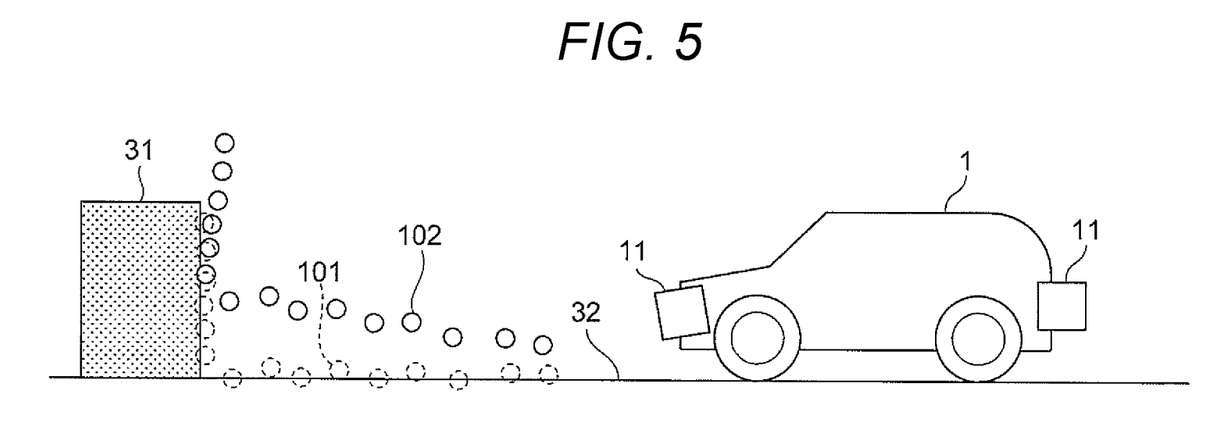
FIG. 5 is a diagram illustrating an example of a three-dimensional coordinate signal in a case where there is an error in posture information according to the present embodiment.

The coordinate signal conversion unit 23 converts a plurality of observation points obtained from the LiDAR sensor 11 into a plurality of three-dimensional coordinate signals 102 on the basis of the posture information in the LiDAR coordinate system (see FIG. 5). In this case, the observation point calculated from the distance information and the irradiation angle of the LiDAR sensor 11 is converted into the three-dimensional coordinate signal 102 in consideration of the installation posture of the LiDAR sensor 11 on the basis of each parameter of the posture information read from the storage unit 21. However, the installation posture indicated by the posture information does not necessarily coincide with the actual installation posture of the LiDAR sensor 11. For example, in a case where the installation posture of the LiDAR sensor 11 has changed from the factory shipment, an error occurs in the recognition result based on the three-dimensional coordinate signal 102 of the outside environment recognition device 12.

Figure 6:
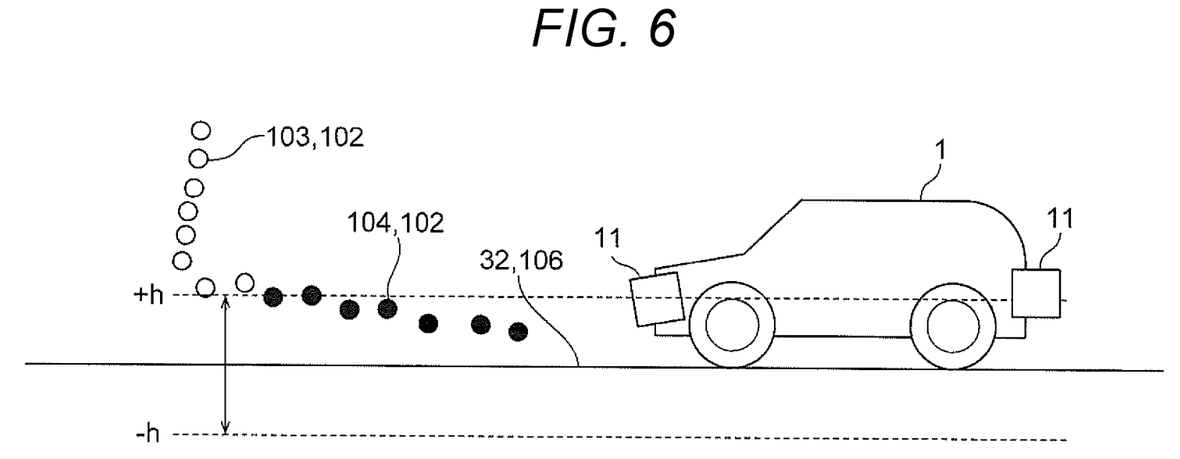
FIG. 6 is a diagram illustrating an example of processing of extracting road surface candidate points according to the present embodiment.
Figure 7:
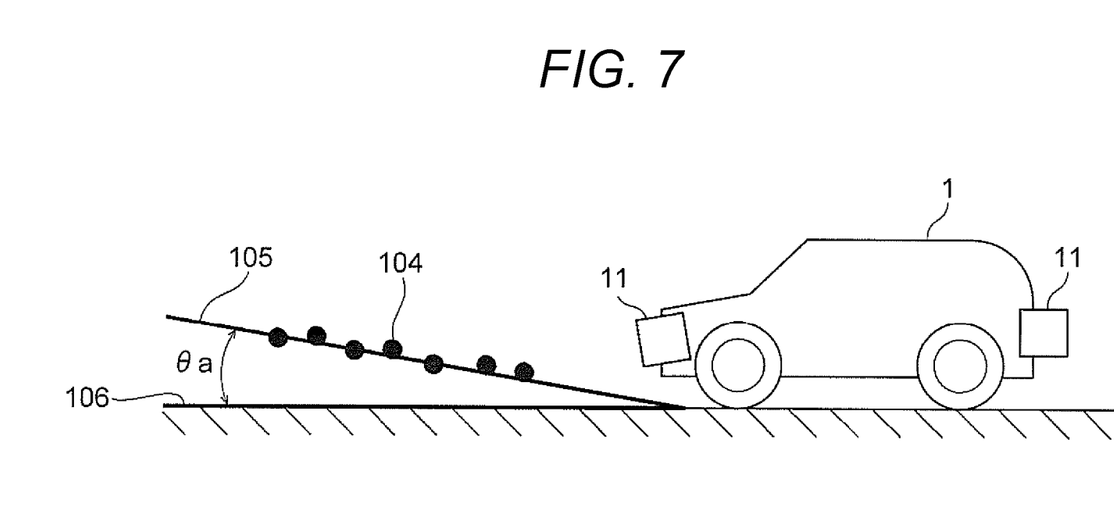
FIG. 7 is a diagram illustrating an example of estimation processing of a road surface plane according to the present embodiment.

The road surface candidate point extraction unit 24 extracts a plurality of road surface candidate points 104 indicating the real road surface 32 from the plurality of three-dimensional coordinate signals 102 based on the height component of each of the three-dimensional coordinate signals 102 (see FIG. 6). In this case, a reference plane 106 having a height of 0 [m] serving as the ground contact surface of the vehicle 1 is set on the basis of the LiDAR coordinate system, and the three-dimensional coordinate signal 102 in which the height component of the three-dimensional coordinate signal 102 is included in a predetermined height range based on the reference plane 106 is extracted as the plurality of road surface candidate points 104. Note that the reference plane 106 is set in advance so as to coincide with the around contact surface on which the vehicle 1 is grounded in a test environment, for example. The road surface plane estimation unit 25 estimates a road surface plane 105 based on the plurality of road surface candidate points 104 (see FIG. 7). In this case, the road surface plane 105 is estimated such that the sum of the distances from the road surface plane 105 to the road surface candidate points 104 is the smallest. In this way, by estimating the road surface plane 105 using the road surface candidate point 104 near the ground contact surface of the vehicle 1, it is possible to estimate the road surface while excluding the influence of the three-dimensional coordinate signal indicating the object other than the road surface as much as possible even under the actual environment.

Figure 8:
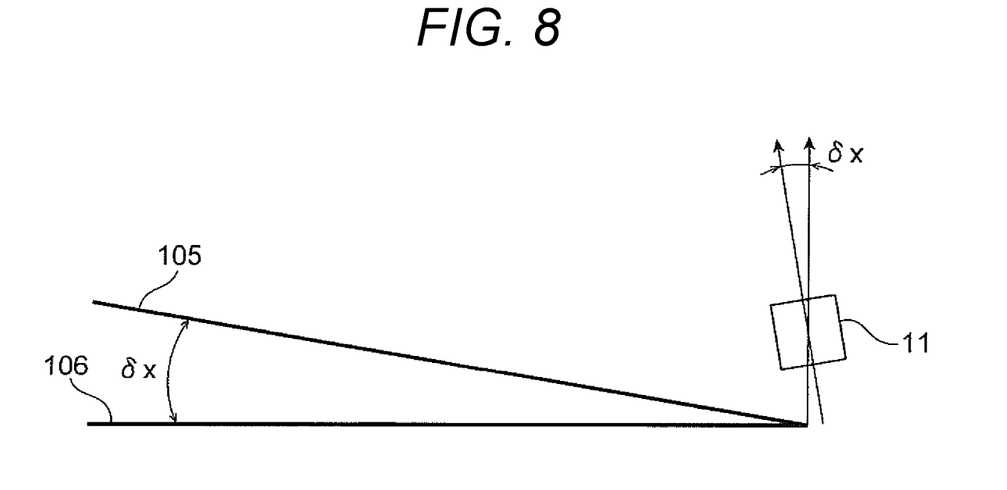
FIG. 8 is a diagram illustrating an example of calculation processing of a calibration amount according to the present embodiment.

The calibration amount calculation unit 26 calculates the calibration amount of the posture information stored in the storage unit 21 based on the reference plane 106 and the road surface plane 105 (see FIG. 8). In this case, the calibration amount of the posture information is calculated from the deviation between the reference plane 106 and the road surface plane 105. The posture information update unit 27 updates the posture information stored in the storage unit 21 by calibrating the posture information of the LiDAR sensor 11 on the basis of the calibration amount. The outside environment recognition device 12 can recognize the actual installation posture of the LiDAR sensor 11 on the basis of the updated posture information. Therefore, even when the installation posture of the LiDAR sensor 11 changes, it is possible to generate a three-dimensional coordinate signal in consideration of the actual installation posture of the LiDAR sensor 11 and output a correct recognition result from the outside environment recognition device 12 to the driving assistance system 15.

When it is determined that at least one of the parameters of the posture information is outside a predetermined allowable range, the installation posture notification unit 28 notifies the driver of the abnormality of the installation posture of the LiDAR sensor 11. When the installation posture of the LiDAR sensor 11 greatly changes, a signal indicating the abnormality of the installation posture is output from the installation posture notification unit 28 to the information display device 16, and it is possible to notify the driver that the recognition function of the outside environment recognition device 12 has deteriorated. When it is determined that at least one of the parameters of the posture information is out of a predetermined allowable range, the stop signal output unit 29 outputs a stop signal for causing the driving assistance system 15 to stop driving assistance using outside environment recognition. When the installation posture of the LiDAR sensor 11 greatly changes, a stop signal of driving assistance is output from the stop signal output unit 29 to the driving assistance system 15, and the driving assistance system 15 can stop using the recognition result of the outside environment recognition device 12.

Each part of the outside environment recognition device 12 is configured by, for example, an electronic control unit (ECU) 30. A processor and a memory are mounted on the ECU 30, and the processor reads and executes a program stored in the memory to perform various processes of the outside environment recognition device 12. The processor may be a Central Processing Unit (CPU) or a Graphics Processing Unit (GPU). The memory is composed of one or more recording media such as a Read Only Memory (ROM), a Random Access Memory (RAM), Non-Volatile RAM (NVRAM) depending on the application. The storage unit 21 may be configured by an NVRAM in the ECU 30 or may be configured by an external non-volatile memory.

Figure 4:
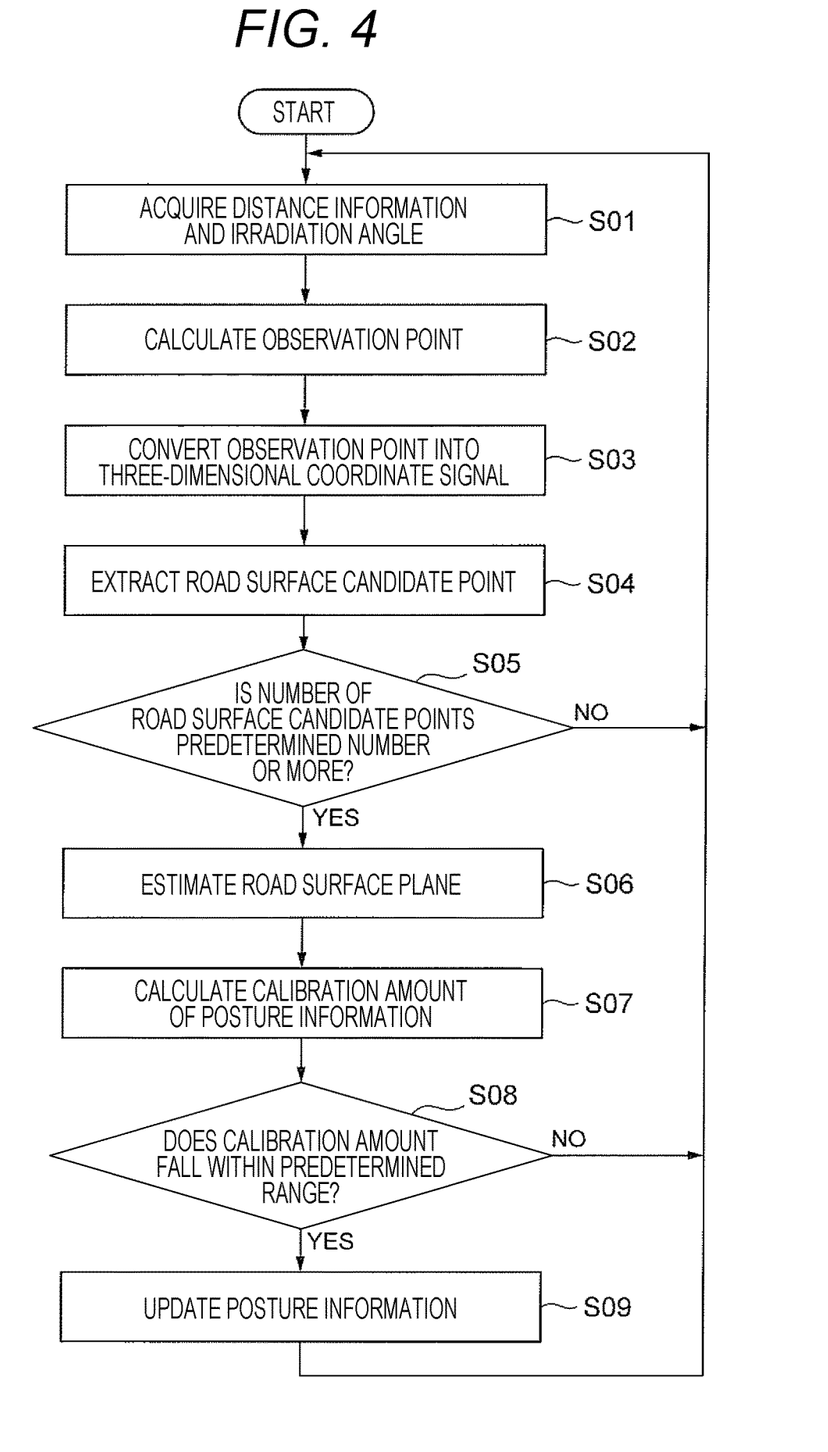
FIG. 4 is a flowchart of processing of updating posture information of a LiDAR sensor according to the present embodiment.

Hereinafter, as the present embodiment, the description will be made according to the procedure of the processing of updating the posture information of the LiDAR sensor illustrated in FIG. 4. FIG. 4 is a flowchart of processing of updating posture information of the LiDAR sensor according to the present embodiment.

When laser light is emitted from the LiDAR sensor 11, the ECU 30 acquires distance information indicating an observation point and an irradiation angle from the LiDAR sensor 11 (Step S01). Next, the ECU 30 calculates three-dimensional coordinates of the observation points in the LiDAR coordinate system based on the distance information and the irradiation angle (Step S02). In this case, when the distance from the light emitting element to the object is L [m], the pitch angle of the irradiation angle of the laser light is P [rad], and the yaw angle is Y [rad], the three-dimensional coordinates (x, y, z) of the observation point are calculated by the following Expression (1). A plurality of observation points can be obtained by converting the distance information into the observation points for each irradiation angle.

[Math. 1]

$$\begin{pmatrix} x \\ y \\ z \end{pmatrix} = L * \begin{pmatrix} \cos(P) * \cos(Y) \\ \cos(P) * \sin(Y) \\ \sin(P) \end{pmatrix} \quad (1)$$

Next, the posture information of the LiDAR sensor 11 is read from the storage unit 21 by the ECU 30, and the three-dimensional coordinates of each observation point are converted into three-dimensional coordinates of a three-dimensional coordinate signal in consideration of the installation posture of the LiDAR sensor 11 (Step S03). In this case, assuming that the pitch angle is Ps [rad], the roll angle is Rs [rad], the yaw angle is Ys [rad], and the offset amount of the installation height from the road surface 32 to the LiDAR sensor 11 is Oz [m] as the posture information of the LiDAR sensor 11, the three-dimensional coordinates (x, y, z) of the three-dimensional coordinate signal obtained by converting the three-dimensional coordinates (xs, ys, zs) of the observation point are calculated by the following Expression (2). A plurality of three-dimensional coordinate signals can be obtained by converting a plurality of observation points on the basis of the posture information of the LiDAR sensor 11.

[Math. 2]

$$\begin{pmatrix} xs \\ ys \\ zs \end{pmatrix} = \begin{pmatrix} x \\ y \\ z \end{pmatrix} \begin{pmatrix} 1 & 0 & 0 \\ 0 & \cos(Rs) & -\sin(Rs) \\ 0 & \sin(Rs) & \cos(Rs) \end{pmatrix} \quad (2)$$

$$\begin{pmatrix} \cos(Ps) & 0 & \sin(Ps) \\ 0 & 1 & 0 \\ -\sin(Ps) & 0 & \cos(Ps) \end{pmatrix} \begin{pmatrix} \cos(Ys) & -\sin(Ys) & 0 \\ \sin(Ys) & \cos(Ys) & 0 \\ 0 & 0 & 1 \end{pmatrix} + \begin{pmatrix} 0 \\ 0 \\ Oz \end{pmatrix}$$

In the present embodiment, since the posture information stored in the storage unit 21 does not correspond to the actual installation posture of the LiDAR sensor 11, an error occurs in the three-dimensional coordinate signal 102 in consideration of the installation posture of the LiDAR sensor 11 (see FIG. 5). That is, since the posture information of the actual installation posture of the LiDAR sensor 11 is not reflected in the storage unit 21 (see FIG. 3), a three-dimensional coordinate signal 102 indicating the side surface of an object 31 and the road surface 32 originally appears at a three-dimensional coordinate position away from the side surface of the object 31 and the road surface 32, and the surrounding environment of the vehicle 1 cannot be accurately recognized. Note that if the posture information stored in the storage unit 21 corresponds to the actual installation posture of the LiDAR sensor 11, a three-dimensional coordinate signal 101 indicating the object 31 and the road surface 32 should be obtained.

Next, the ECU 30 extracts the road surface candidate point 104 for road surface estimation from the plurality of three-dimensional coordinate signals 102 (Step S04). Since the three-dimensional coordinate signal 102 includes both the point at which the road surface 32 is detected and the point at which the object 31 other than the road surface 32 is detected, the point at which the road surface 32 is detected is extracted as the road surface candidate point 104 (see FIG. 6). By using the plurality of road surface candidate points 104 for estimation of the road surface plane 105 (see FIG. 7), estimation accuracy of the road surface plane 105 is improved. In the present embodiment, when the height component in the Z-axis direction of the three-dimensional coordinate signal 102 is included in a predetermined height range based on the reference plane 106 which is the ground contact surface of the vehicle 1, the height component is extracted as the road surface candidate point 104. In this case, the Z-axis coordinate value of the three-dimensional coordinate signal 102 is converted into a coordinate value based on the reference plane 106, and it is determined whether the Z-axis coordinate value is included in the predetermined height range. Note that the reference plane 106 is set by designating a Z-axis coordinate value in the LiDAR coordinate system, and is set in advance by, for example, a distance from the origin of the LiDAR coordinate system to the ground contact surface (road surface) of the vehicle 1.

FIG. 6 illustrates an example in a case where the horizontal road surface 32 is the reference plane 106. In this example, when the upper limit threshold for the extraction processing of the road surface candidate point 104 is +h and the lower limit threshold is −h, the three-dimensional coordinate signal of the black circle within the height range indicated by the broken line is extracted as the road surface candidate point 104. Note that a three-dimensional coordinate signal 103 of a white circle outside the height range is rejected. The setting of the height range for processing of extracting the road surface candidate point 104 may be changed as appropriate. For example, the absolute values of the upper limit threshold and the lower limit threshold may be different from each other, or only one of the upper limit threshold and the lower limit threshold may be set. Further, the height range may be dynamically changed. For example, in a place where there are many objects 31 in the surroundings, the height range may be narrowed to reduce the influence of the three-dimensional coordinate signal indicating the object 31, and in a place where there are few objects 31 in the surroundings, the height range may be widened to extract many road surface candidate points 104.

Next, the ECU 30 determines whether there are a predetermined number of road surface candidate points 104 or more (Step S05). If the road surface candidate points 104 are less than the predetermined number (NO in Step S05), it is determined that the influence of noise increases at the time of estimation of the road surface plane 105 (see FIG. 7), and the process of updating the installation posture is stopped. On the other hand, when there are a predetermined number of road surface candidate points 104 or more (YES in Step S05), the road surface plane 105 is estimated from the road surface candidate points 104 by the ECU 30 (Step S06). The road surface plane 105 is expressed by the mathematical model of the following Expression (3) in the orthogonal coordinate system (see FIG. 8). The road surface plane 105 is estimated by obtaining parameters (a, b, c) of Expression (3). The parameter a corresponds to the pitch angle, the parameter b corresponds to the roll angle, and the parameter c corresponds to the installation height.

[Math. 3]

$$z = ax + by + c \quad (3)$$

In this case, the parameters (a, b, c) of the road surface plane 105 are estimated using the road surface candidate point 104, but the estimation accuracy is deteriorated due to observation noise of the road surface candidate point 104, variation in the road surface candidate point 104 due to the surface condition of the road surface, and the like. In order to reduce errors due to observation noise and variation of the road surface candidate point 104, a coefficient that minimizes the sum of squares of differences between the Z-axis value of each road surface candidate point 104 and the Z-axis value of the road surface plane 105 corresponding to each road surface candidate point 104 is calculated using the following Expression (4). (x, y, z) in Expression (4) are the three-dimensional coordinates of the road surface candidate point. The parameters (a, b, c) are calculated by solving simultaneous equations obtained by calculating each element in Expression (4) using all the road surface candidate points 104 using an arbitrary solution. Note that Σ in Expression (4) means the sum. As a solution of the simultaneous equations, for example, a sweep method or a Crummel formula may be used.

[Math. 4]

$$\begin{pmatrix} \sum x^2 & \sum xy & \sum x \\ \sum xy & \sum y^2 & \sum y \\ \sum x & \sum y & \sum 1 \end{pmatrix} \begin{pmatrix} a \\ b \\ c \end{pmatrix} - \begin{pmatrix} \sum xz \\ \sum yz \\ \sum z \end{pmatrix} = 0 \quad (4)$$

Next, the ECU 30 calculates calibration amounts (δx, δy, δz) of the posture information using the parameters (a, b, c) of the road surface plane 105 (Step S07). The angle calibration amounts (δx, δy) are calculated as a deviation between the inclination of the road surface plane 105 and the inclination of the reference plane 106. Therefore, after the parameters (a, b) of the road surface plane 105 are converted into the angles (θa, θb) by the following Expression (5), the deviation between the angles (θa, θb) and the inclination of the reference plane 106 is calculated by the following Expression (6) (see FIG. 8). Since the reference plane 106 is a horizontal plane this time, the inclination of the reference plane 106 is (0, 0). As a result, the calibration amounts (δx, δy) of the pitch angle and the roll angle of the installation posture are calculated. As the calibration amount δz of the height, the parameter c of the road surface plane 105 is used as it is.

[Math. 5]

$$\begin{pmatrix} \theta_a \\ \theta_b \end{pmatrix} = \begin{pmatrix} \arctan(a) \\ \arctan(b) \end{pmatrix} \quad (5)$$

[Math. 6]

$$\begin{pmatrix} \delta_x \\ \delta_y \end{pmatrix} = \begin{pmatrix} 0 \\ 0 \end{pmatrix} - \begin{pmatrix} \theta_a \\ \theta_b \end{pmatrix}, \delta_z = c \quad (6)$$

Next, the ECU 30 determines whether each of calibration amounts (δx, δy, δz) is within a predetermined range (Step S08). In a case where any of the calibration amounts (δx, δy, δz) deviates from the predetermined range (NO in Step S08), it is determined that the noise is transient noise due to an influence of an instantaneous change in the vehicle posture, an impact, or the like, and the process of updating the posture information of the LiDAR sensor 11 is stopped. On the other hand, if all of the calibration amounts (δx, by, δz) are within the predetermined range (YES in Step S08), the ECU 30 updates the posture information stored in the storage unit 21 with the calibration amounts (δx, δy, δz) being reflected in the posture information of the LiDAR sensor 11 (Step S09). Assuming that the pitch angle of the installation posture is Ps [rad], the roll angle is Rs [rad], and the offset amount of the installation height is Oz [m], the posture information of the LiDAR sensor 11 is updated by the following Expression (7).

[Math. 7]

$$\begin{pmatrix} P_s \\ R_s \\ O_z \end{pmatrix} = \begin{pmatrix} P_s \\ R_s \\ 0 \end{pmatrix} + \begin{pmatrix} \delta_x \\ \delta_y \\ \delta_z \end{pmatrix} \quad (7)$$

Figure 9:
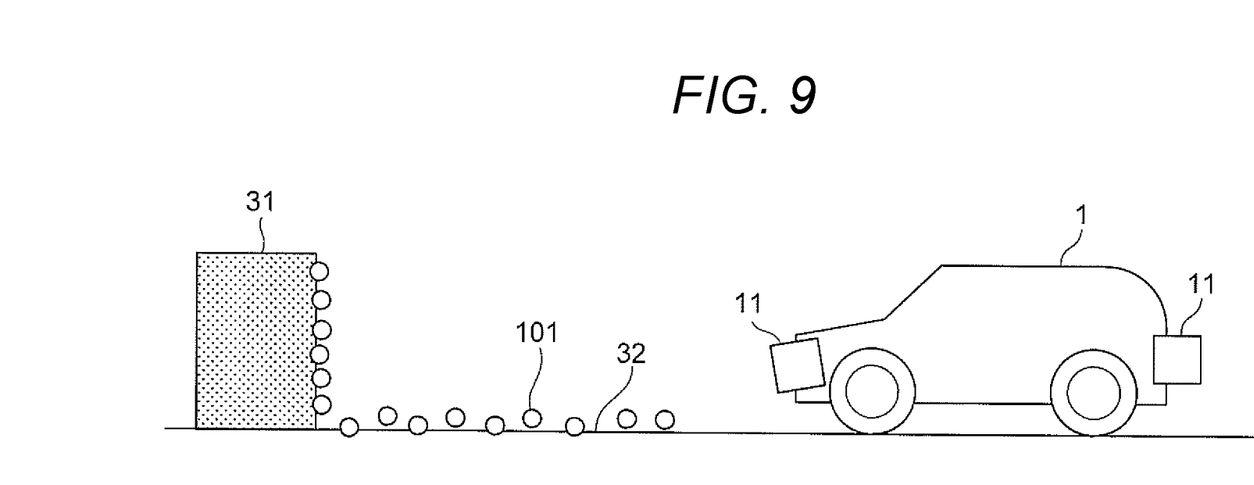
FIG. 9 is a diagram illustrating an example of a three-dimensional coordinate signal in a case where there is no error in posture information according to the present embodiment.

In this manner, posture information indicating the actual installation posture of the LiDAR sensor 11 is stored in the storage unit 21. Since each observation point obtained from the LiDAR sensor 11 is converted into the three-dimensional coordinate signal 101 corresponding to the actual installation posture, the surrounding environment of the vehicle 1 such as the road surface 32 and the object 31 can be accurately recognized by the three-dimensional coordinate signal (see FIG. 9). As the predetermined height range of the road surface candidate point in Step S04, the predetermined number of the road surface candidate points in Step S05, and the predetermined range of the calibration amount in Step S08, values experimentally, empirically, or theoretically obtained from past data or the like are used according to required accuracy.

In the above-described software posture information calibration processing, the outside environment can be recognized in consideration of the actual installation posture of the LiDAR sensor 11, but the installation posture of the LiDAR sensor 11 is not correctly re-installed. In a case where the installation posture of the LiDAR sensor 11 is greatly changed, the outside environment recognition device 12 cannot exert original performance. For example, in a case where the installation angle of the LiDAR sensor is greatly changed downward, the upper limit of the observation area is lowered, and an object cannot be detected in the assumed observation area. In addition, in a case where a high-resolution observation area and a low-resolution observation area are set in the LiDAR sensor 11, the LiDAR sensor 11 is installed in the vehicle 1 such that the high-resolution observation area matches an important point. However, when the installation posture of the LiDAR sensor 11 greatly changes, the high-resolution observation area deviates from the important point, and the recognition accuracy of the important point decreases.

Therefore, in the present embodiment, when at least one of parameters (Ps, Rs, Oz) of the posture information after calibration falls outside a predetermined allowable range, the installation posture notification unit 28 notifies the driver of the abnormality of the installation posture of the LiDAR sensor 11, and the stop signal output unit 29 outputs a stop signal for driving assistance to the driving assistance system 15. As a result, it is possible to notify the driver that the recognition accuracy of the outside environment recognition device 12 has deteriorated due to the influence of the installation posture of the LiDAR sensor 11, prompt the maintenance of the LiDAR sensor 11, and stop the driving assistance using the recognition result with low accuracy for the driving assistance system 15. For example, the driver may be notified of the abnormality of the installation posture by blinking an LED lamp or the like or displaying an image or a message on an information display device. Further, the LiDAR sensor 11 may be installed in the vehicle 1 via an adjustment mechanism (not illustrated) having a plurality of adjustment axes, and the actual installation posture of the LiDAR sensor 11 may be adjusted to a correct installation posture on the basis of the calibration amounts (δx, δy, δz) by the adjustment mechanism.

The installation posture of the LiDAR sensor 11 changes not only when the entire vehicle 1 is inclined due to aging deterioration, impact, or the like but also when the entire vehicle 1 is inclined by the acceleration of the vehicle 1. Therefore, in the present embodiment, the storage unit 21 may separately store the posture information calibrated while the vehicle 1 is traveling and the posture information calibrated while the vehicle 1 is stopped or slowly traveling. It is possible to distinguish between a temporary change in the installation posture of the LiDAR sensor 11 occurring only while the vehicle 1 is traveling and a steady change in the installation posture of the LiDAR sensor 11 occurring even while the vehicle 1 is stopped or slowly traveling. At the start of the processing of updating the posture information of the LiDAR sensor 11, the ECU 30 determines that the vehicle is traveling, stopping, or slowing down according to the acceleration from the acceleration sensor 13, and the posture information is stored in the storage unit 21 according to the traveling state. As a result, the surrounding environment of the vehicle 1 can be recognized using posture information suitable for the traveling state. In addition, even in a case where the installation posture of the LiDAR sensor 11 significantly changes, it is possible to cause the driver to recognize that there is no abnormality in the installation posture as long as the change is temporary in the installation posture.

The installation posture of the LiDAR sensor 11 also changes when the entire vehicle 1 is inclined depending on the seating situation of the passenger. Therefore, in the present embodiment, the storage unit 21 may store the seating position and the posture information of the passenger on the seating seat in association with each other. The change in the installation posture of the LiDAR sensor 11 can be distinguished according to the number of passengers and the seating situation. At the start of the processing of updating the posture information of the LiDAR sensor 11, the seating position of the passenger is determined by the ECU 30 according to the seating information from the seating sensor 14, and the posture information is stored in the storage unit 21 in accordance with the seating position. As a result, the surrounding environment of the vehicle 1 can be recognized using posture information suitable for the seating situation on the seating seat. In addition, even in a case where the installation posture of the LiDAR sensor 11 has changed significantly, if the installation posture has changed only in a specific seating situation, it is possible to cause the driver to recognize that there is no abnormality in the installation posture.

In addition, the execution timing of processing of updating the posture information of the LiDAR sensor 11 may be determined according to the position information of the vehicle 1. In this case, by using position information of the vehicle 1 obtained from a global positioning system (GPS) function of the vehicle 1 and map data in which favorable condition points at which a large number of road surface candidate points 104 can be acquired are registered, the processing of updating the posture information of the LiDAR sensor 11 is performed at a timing when the vehicle 1 reaches the favorable condition points. Examples of the favorable condition point include a parking lot and a flat main road. The favorable condition point may be preset on the map data by a system designer, or may be set later on the map data by a passenger of the vehicle 1. A predetermined section of a road may be set on the map data as a favorable condition point. The road surface candidate point 104 is extracted while passing through the end section from the start section of the road.

Further, in the present embodiment, since the LiDAR sensor 11 is provided in front of and behind the vehicle 1, the estimation accuracy of the road surface plane 105 can be improved. In addition, a change in the gradient of the road surface 32 is estimated by using the recognition results of the front LiDAR sensor 11 and the rear LiDAR sensor 11, and the processing of updating the posture information of the LiDAR sensor 11 is restricted in a place where the change in the gradient is large. For example, when a road surface with a gradient is recognized in front of the vehicle by an observation point obtained from the front LiDAR sensor 11, and a horizontal road surface is recognized behind the vehicle by an observation point obtained from the rear LiDAR sensor 11, the processing of updating the posture information is restricted.

As described above, in the outside environment recognition device 12 of the present embodiment, only the road surface candidate point 104 indicating the road surface is extracted from the plurality of three-dimensional coordinate signals 102 obtained from the observation result of the LiDAR sensor 11. Therefore, the road surface plane 105 can be estimated without being affected by the three-dimensional coordinate signal 102 indicating other than the road surface 32 even under the actual environment, and the calibration amount of the posture information of the LiDAR sensor 11 can be calculated by comparing the road surface plane 105 with the predetermined reference plane 106. Therefore, regardless of the irradiation method of the distance measuring sensor, it is possible to sufficiently suppress deterioration in recognition performance of the outside environment recognition device due to a change in the installation posture of the distance measuring sensor.

Note that, in the above-described embodiment, the posture information of the LiDAR sensor 11 includes the installation height from the road surface 32 to the LiDAR sensor 11, the pitch angle, and the roll angle, but the invention is not limited to this configuration. The posture information of the LiDAR sensor 11 may include at least one of the installation height, the pitch angle, and the roll angle of the LiDAR sensor 11. Further, the installation information is appropriately changed according to the installation position of the LiDAR sensor 11, and for example, the installation information may include a yaw angle in addition to the installation height, the pitch angle, and the roll angle.

In addition, in the above-described embodiment, the posture information update unit 27 updates the posture information of the LiDAR sensor 11 stored in the storage unit 21, but the invention is not limited to this configuration. The initial design value and the calibration amount of the posture information may be stored in the storage unit 21, and the posture information after the calibration of the LiDAR sensor 11 may not be stored.

As described above, an outside environment recognition device (12) according to the present embodiment is an outside environment recognition device (12) that recognizes an outside environment around a vehicle by laser light emitted from a distance measuring sensor (LiDAR sensor 11) installed in the vehicle (1), the outside environment recognition device including: a storage unit (21) that stores posture information of an installation posture of the distance measuring sensor (LiDAR sensor 11) in a three-dimensional predetermined coordinate system; a coordinate signal conversion unit (23) that converts a plurality of observation points obtained from the distance measuring sensor (LiDAR sensor 11) in the predetermined coordinate system into a plurality of three-dimensional coordinate signals (102) based on the posture information; a road surface candidate point extraction unit (24) that extracts a plurality of road surface candidate points (104) indicating a road surface (32) from the plurality of three-dimensional coordinate signals (102) based on a height component of each of the three-dimensional coordinate signals (102), a road surface plane estimation unit (25) that estimates a road surface plane (105) based on the plurality of road surface candidate points (104), and a calibration amount calculation unit (26) that calculates a calibration amount of the posture information based on a reference plane (106) set based on a predetermined coordinate system and the road surface plane (105).

According to this configuration, only the road surface candidate points (104) indicating the road surface (32) are extracted from the plurality of three-dimensional coordinate signals (102) obtained from the observation result of the distance measuring sensor (LiDAR sensor 11). Therefore, the road surface plane (105) can be estimated without being affected by a three-dimensional coordinate signal (102) indicating other than the road surface (32) even under the actual environment, and the calibration amount of the posture information of the distance measuring sensor (LiDAR sensor 11) can be calculated by comparing the road surface plane (105) with the predetermined reference plane (106). Therefore, regardless of the irradiation method of the distance measuring sensor (LiDAR sensor 11), it is possible to sufficiently suppress deterioration in recognition performance of the outside environment recognition device (12) due to a change in the installation posture of the distance measuring sensor (LiDAR sensor 11).

The outside environment recognition device (12) according to the present embodiment includes a posture information update unit (27) that updates posture information stored in the storage unit (21) by calibrating posture information on the basis of a calibration amount. According to this configuration, it is possible to recognize the outside environment around the vehicle in consideration of the actual installation posture of the distance measuring sensor (LiDAR sensor 11).

In the outside environment recognition device (12) according to the present embodiment, the posture information includes at least one of an installation height from the road surface (32) to the distance measuring sensor (LiDAR sensor 11), a pitch angle having a vehicle width direction of the vehicle (1) as a rotation axis, and a roll angle having a traveling direction of the vehicle (1) as a rotation axis. According to this configuration, at least one of the installation height, the pitch angle, and the roll angle can be calibrated as posture information.

In an outside environment recognition device (12) according to the present embodiment, a road surface candidate point extraction unit (24) extracts, as a plurality of road surface candidate points (104), the three-dimensional coordinate signal (102) in which a height component of the three-dimensional coordinate signal (102) is included in a predetermined height range based on a reference plane (106). According to this configuration, it is possible to estimate the road surface (32) while excluding the influence of the three-dimensional coordinate signal (102) indicating the object (31) other than the road surface (32) as much as possible even under the actual environment.

In the outside environment recognition device (12) according to the present embodiment, the road surface plane estimation unit (25) estimates the road surface plane (105) such that the sum of the distances from the road surface plane (105) to the respective road surface candidate points (104) is the smallest. According to this configuration, it is possible to reduce errors due to observation noise and variations of the road surface candidate points (104).

In the outside environment recognition device (12) according to the present embodiment, the storage unit (21) separately stores the posture information calibrated during traveling and the posture information calibrated during stop or slow traveling. According to this configuration, it is possible to distinguish between a temporary change in the installation posture of the distance measuring sensor (LiDAR sensor 11) occurring only while the vehicle (1) is traveling and a steady change in the installation posture of the distance measuring sensor (LiDAR sensor 11) occurring even while the vehicle (1) is stopped or slowly traveling.

In an outside environment recognition device (12) according to the present embodiment, a seating sensor (14) that detects a seating position of a passenger is installed on a seating seat of the vehicle (1), and the storage unit (21) stores the seating position of the passenger and posture information in association with each other. According to this configuration, it is possible to distinguish a change in the installation posture of the distance measuring sensor (LiDAR sensor 11) according to the number of passengers and the seating situation.

The outside environment recognition device (12) according to the present embodiment includes an installation posture notification unit (28) that notifies the driver of an abnormality in the installation posture of the distance measuring sensor (LiDAR sensor 11) when at least one of the parameters of the posture information falls outside a predetermined allowable range. According to this configuration, it is possible to notify the driver that the recognition function of the outside environment recognition device (12) is deteriorated when the distance measuring sensor is greatly changed.

The outside environment recognition device (12) according to the present embodiment includes a stop signal output unit (29) that outputs a stop signal for stopping driving assistance using outside environment recognition to the driving assistance system (15) when at least one of the parameters of the posture information falls outside a predetermined allowable range. According to this configuration, it is possible to cause the driving assistance system (15) to stop using the recognition result of the outside environment recognition device (12) when the distance measuring sensor is greatly changed.

In the outside environment recognition device (12) according to the present embodiment, the distance measuring sensor (LiDAR sensor 11) is a plurality of distance measuring sensors installed at a plurality of locations in the vehicle (1). According to this configuration, the estimation accuracy of the road surface plane (105) can be enhanced by the plurality of distance measuring sensors (LiDAR sensors 11).

Hitherto, the embodiments of the invention have been described, but the invention is not limited to the embodiments. Various modifications may be made within a scope not departing from the spirit of the invention disclosed in claims. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

REFERENCE SIGNS LIST 1 vehicle
11 LiDAR sensor (distance measuring sensor)
12 outside environment recognition device
14 seating sensor
15 driving assistance system
21 storage unit
23 coordinate signal conversion unit
24 road surface candidate point extraction unit
25 road surface plane estimation unit
26 calibration amount calculation unit
27 posture information update unit
28 installation posture notification unit
29 stop signal output unit
32 road surface
104 road surface candidate point
105 road surface plane
106 reference plane

The invention claimed is:

1. An outside environment recognition device that recognizes an outside environment around a vehicle by laser light emitted from a distance measuring sensor installed in the vehicle, the outside environment recognition device comprising:
  storing posture information of an installation posture of the distance measuring sensor in a three-dimensional predetermined coordinate system;
  converting a plurality of observation points obtained from the distance measuring sensor into a plurality of three-dimensional coordinate signals on the basis of the posture information in the predetermined coordinate system;
  extracting a plurality of road surface candidate points indicating a road surface from the plurality of three-dimensional coordinate signals based on a height component of each of the three-dimensional coordinate signals;
  estimating a road surface plane based on the plurality of road surface candidate points;
  calculating a calibration amount of the posture information based on a reference plane set based on the predetermined coordinate system and the road surface plane;
  Updating posture information in response to determining that the calibration amount is within a predetermined range, updating the posture information stored by calibrating the posture information based on the calibration amount; and
  a seating sensor that detects a seating position of a passenger in a seat of the vehicle, storing the seating position of the passenger and the posture information in association with each other, and
  updating the posture information in response to determining the vehicle is positioned at a favorable condition point, the favorable condition point being at least one of a flat road, or a predetermined section of a road where the plurality of road surface candidate points can be obtained, and restrict updating the posture information in response to determining a change in gradient of a road is above a threshold.

2. The outside environment recognition device according to claim 1, wherein the posture information includes at least one of an installation height from the road surface to the distance measuring sensor, a pitch angle having a width direction of the vehicle as a rotation axis, and a roll angle having a traveling direction of the vehicle as a rotation axis.

3. The outside environment recognition device according to claim 1, wherein extracting, as the plurality of road surface candidate points, a three-dimensional coordinate signal whose height component of the three-dimensional coordinate signal is included in a predetermined height range based on the reference plane.

4. The outside environment recognition device according to claim 1, wherein estimating the road surface plane such that a sum of distances from the road surface plane to each of the road surface candidate points is minimized.

5. The outside environment recognition device according to claim 1, wherein the storage unit separately stores posture information calibrated during traveling and posture information calibrated during stop or slow traveling.

6. The outside environment recognition device according to claim 1, comprising: notifying a driver of an abnormality in an installation posture of the distance measuring sensor when at least one of the parameters of the posture information falls outside a predetermined allowable range.

7. The outside environment recognition device according to claim 1, comprising: outputting a stop signal for causing a driving assistance system to stop driving assistance using outside environment recognition when at least one of the parameters of the posture information falls outside a predetermined allowable range.

8. The outside environment recognition device according to claim 1, wherein the distance measuring sensor is a plurality of distance measuring sensors installed at a plurality of locations of the vehicle.

\* \* \* \* \*